Feb. 5, 1963 C. A. MEYER 3,076,670
SHEET METAL CONTAINERS AND A METHOD OF AND
APPARATUS FOR THE MANUFACTURE THEREOF
Filed July 9, 1959 5 Sheets—Sheet 1
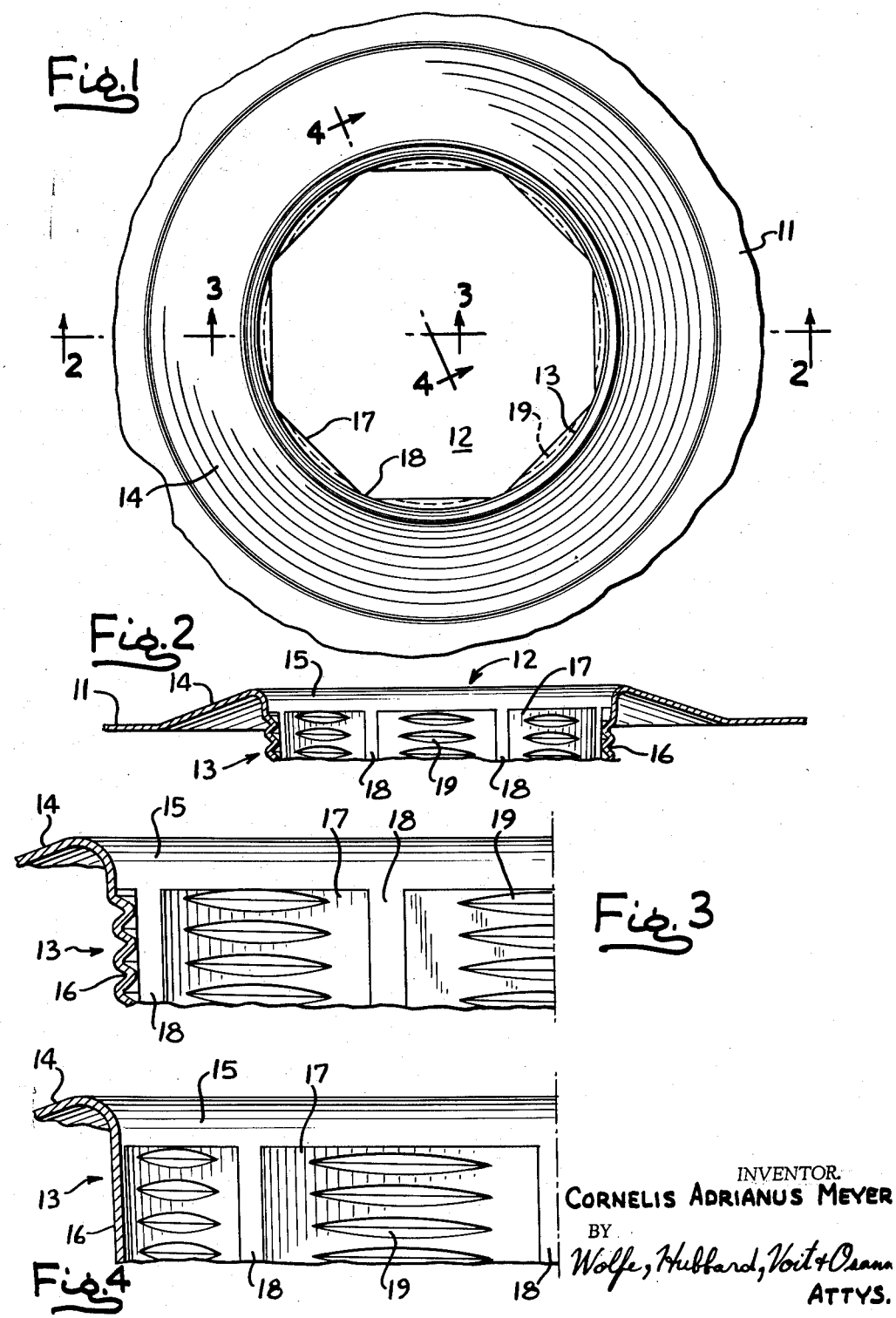
INVENTOR.
CORNELIS ADRIANUS MEYER
BY
Wolfe, Hubbard, Voit + Osann
ATTYS.

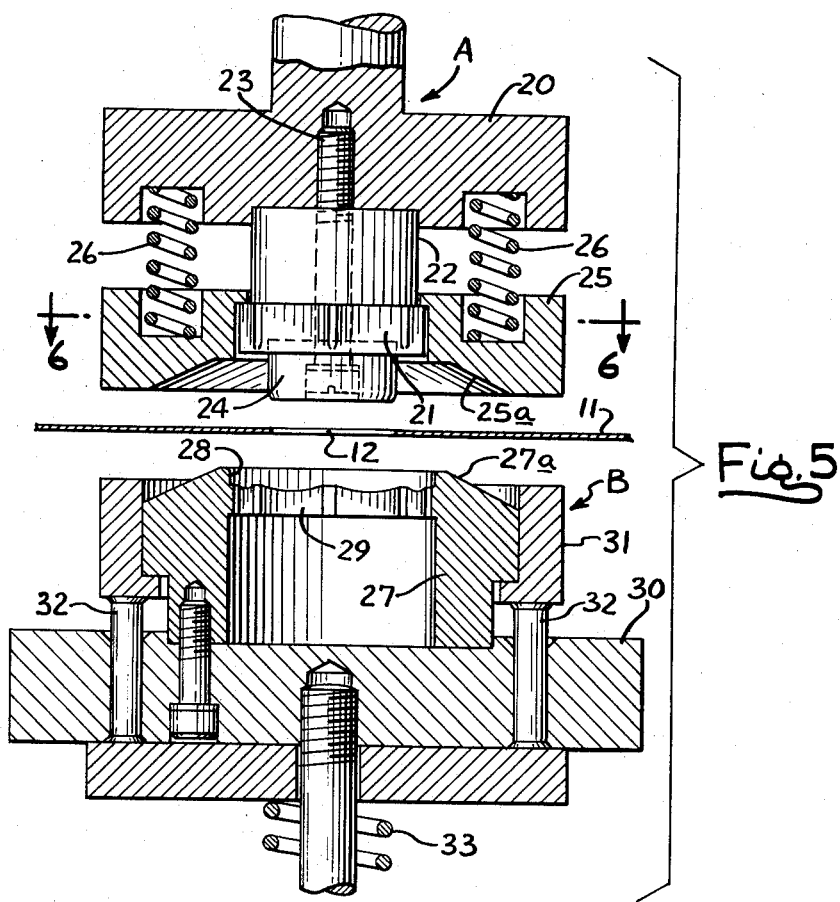

Feb. 5, 1963 C. A. MEYER 3,076,670
SHEET METAL CONTAINERS AND A METHOD OF AND
APPARATUS FOR THE MANUFACTURE THEREOF
Filed July 9, 1959 5 Sheets-Sheet 3

INVENTOR.
CORNELIS ADRIANUS MEYER
BY
Wolfe, Hubbard, Voit & Osann
ATTYS

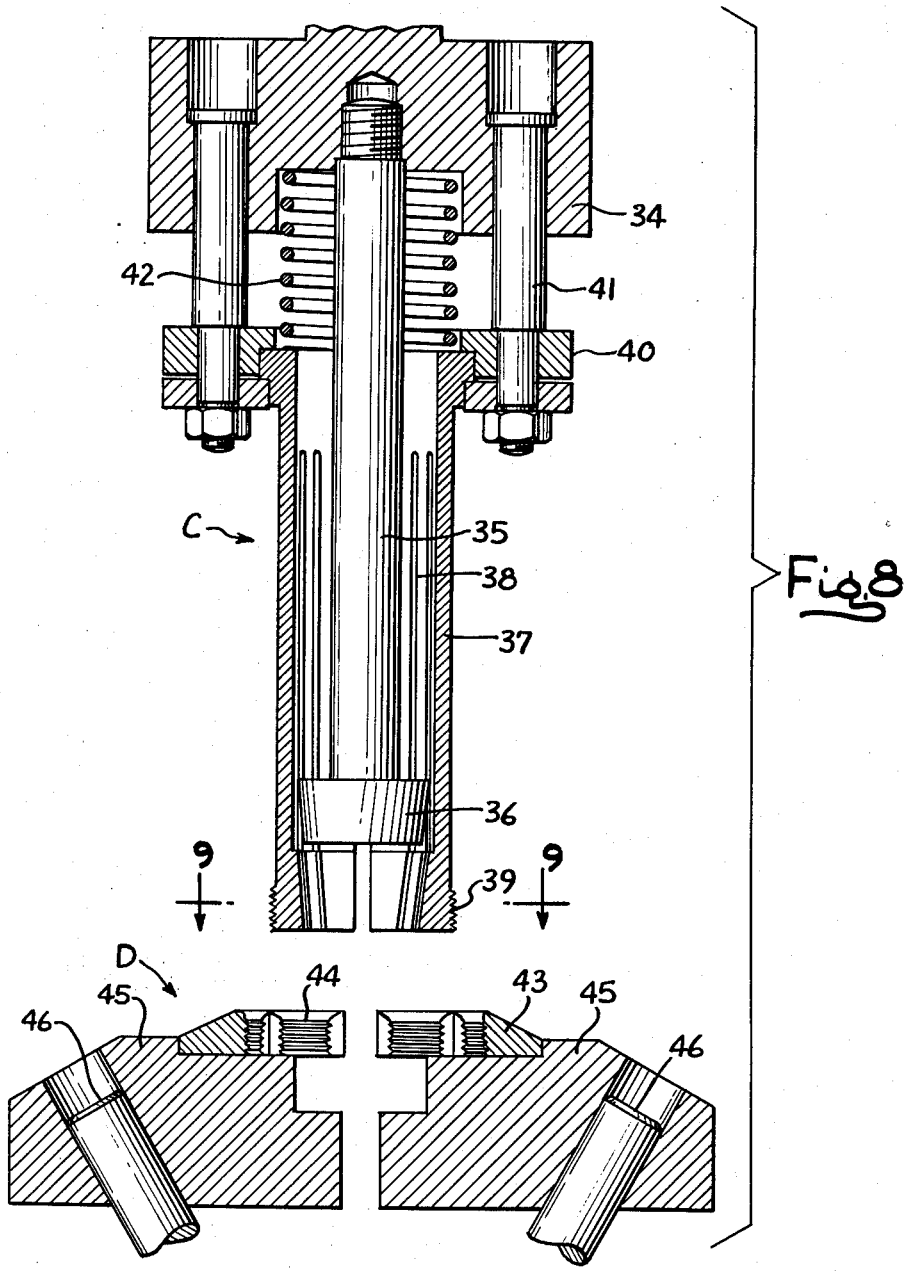

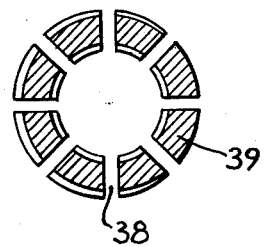
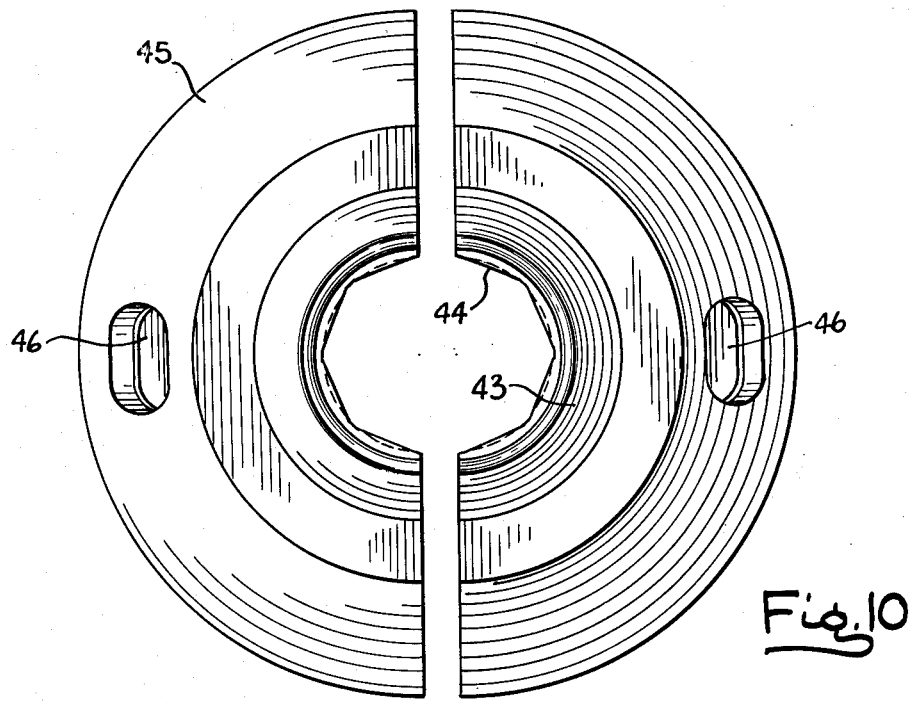

United States Patent Office
3,076,670
Patented Feb. 5, 1963

3,076,670
SHEET METAL CONTAINERS AND A METHOD OF AND APPARATUS FOR THE MANUFACTURE THEREOF
Cornelis Adrianus Meyer, Bloemendaal, Netherlands, assignor to Van Leer Industries Limited, Birmingham, England, a limited liability company of England
Filed July 9, 1959, Ser. No. 825,910
3 Claims. (Cl. 285—221)

This invention relates to sheet metal containers, and it is more particularly concerned with the closure flanges for the bung holes of such containers.

In the manufacture of sheet metal containers such for instance as steel drums of the type commonly used in the shipment and storage of oil and other liquid, semi-liquid, pulverized or granular substances, it is customary to provide an opening or bung hole in one wall for the filling and emptying of the container. To provide for attachment of a closure for sealing of the opening, a common practice is to insert a bung hole bushing into an orifice in the container wall or container head and to secure the bushing to the wall in any suitable way. The bushing is usually provided with an internal screw thread adapted to receive a bung or like closure member having an external screw thread.

The production of closure elements for the containers in the above manner has proved rather laborious and moreover sometimes gives rise to constructional or manufacturing difficulties particularly when the wall thickness of the container is relatively thin. To avoid these difficulties, attempts have been made to form an internally screw-threaded bung hole flange directly on a wall of the container instead of providing a separate bung hole bushing. For example, a sheet metal container has been proposed having a cylindrical closure flange projecting from and integral with the sheet metal wall or head of the container and surrounding a bung hole therein, the flange having a screw thread pressed into it. This construction and the method of making it have, however, been found unsatisfactory in practice and consequently are unsuitable for commercial use.

One object of the present invention is to provide a threaded closure flange of improved form and construction which effectively overcomes the difficulties and objections encountered in previous attempts to produce integral closure flanges in thin wall containers. More specifically, it is an object of the invention to provide a threaded closure flange which can be produced efficiently and practically and which affords a sturdy and eminently satisfactory means for securing a closure member in the bung hole of a container.

Another object is to provide an integral closure flange of novel shape and configuration throughout at least a portion of its height which materially facilitates the formation of screw threads therein and which greatly reduces the strains imposed on the metal of the flange in the formation of the threads so that development of cracks or other fractures and their propagation along the threads is effectively avoided. An ancillary object is to provide a closure flange having its threaded portion reinforced by unthreaded ribs extending transversely across the threads and in which the ribs additionally serve to distribute axial forces imposed on the threads over the entire flange.

Still another object is to provide an integral threaded closure flange which enables a sharper screw thread profile to be obtained without risk of tearing of fracturing the metal and which enables the flange to accommodate a substantially greater number of threads.

Other objects and advantages of the invention will become apparent from the following detailed description of the preferred embodiment illustrated in the accompanying drawings in which:

FIGURE 1 is a plan view of a portion of a sheet metal container having an orifice in one wall or head surrounded by a threaded closure flange projecting from and integral with the metal of the wall or head constructed in accordance with the invention;

FIG. 2 is a cross-sectional view taken approximately on the line 2—2 of FIG. 1;

FIG. 3 is a fragmentary section on an enlarged scale taken on the line 3—3 of FIG. 1;

FIG. 4 is a fragmentary section on an enlarged scale taken on the line 4—4 of FIG. 1;

FIG. 5 is a view partly in vertical section and partly in elevation of the essential portions of a preferred embodiment of die mechanism for carrying out the first phase of the operation on the sheet metal to form a closure flange according to the invention;

FIG. 8 is a view partly in section and partly in elevation of the essential portions of a preferred embodiment of a die mechanism for carrying out the second phase of the operation of forming a threaded closure flange according to the invention;

FIG. 9 is a sectional view taken on the line 9—9 of FIG. 8; and

FIG. 10 is a plan view of the lower unit of the die mechanism shown in FIG. 8.

Figure 6:
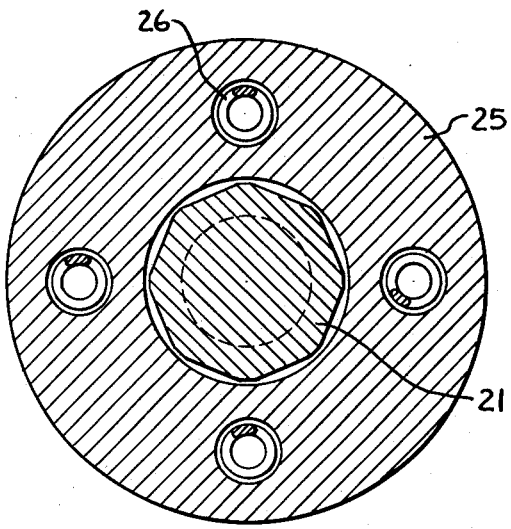
FIG. 6 is a section view taken on the line 6—6 of FIG. 5.

While a preferred form of the closure flange of the invention and the preferred method of and apparatus for producing that flange on a sheet metal container have been shown and will be described in detail, it is to be understood that this is merely illustrative and that various changes and modifications may be made in the form of the closure flange and its formation may be effected by other methods and apparatus without departing from the spirit and scope of the invention as more broadly or generally characterized in the appended claims.

By way of illustration, the invention has been shown as applied to a container shown in FIGS. 1–4 of the drawings as having a sheet metal wall or head 11 with an orifice such as a bung hole 12 formed therein. For attachment of a closure, the orifice 12 is surrounded by a flange 13 integral with the container wall or head 11 and projecting downwardly from the plane of the wall. In the particular container illustrated the upper end of the flange is offset upwardly relative to the wall by a conical portion 14 pressed into the wall.

In carrying out the invention, the flange 13 is formed to present at least over a part of its height a cross section in the shape of a polygon having rounded corners. In the particular form shown, the upper portion 15 of the flange 13 which joins the conical portion 14 of the wall is circular and merges into the polygonal lower portion 16 which, in this instance, is octagonal in shape. It is to be noted that the eight flat sides 17 provided on the polygonal portion of the flange are positioned within the circle defined by the circular portion 15 and the corners 18 between and connecting the sides 17 are rounded.

Each of the flat sides 17 of the octagonal flange portion 16 has internal screw threads 19 pressed therein. In accordance with one aspect of the invention, the flange 13 is formed initially so that the distance from the inner surface wall of the corners 18 to the axis of the orifice 12 is substantially equal to the radius of the orifice 12 and to the distance of the inner surface wall of the flat sides 17 to the same axis increased by at least the depth of the screw threads 19. Accordingly, the corner portions 18 are positioned to provide a transverse interruption between the threads in adjacent flat sides. This permits pressing of the screw thread from the inside outwardly so that the thread forming tool acts directly on the inner surface wall of the flange and is thus capable of forming a more accurate thread which is important since the externally screw threaded bung must cooperate with the threads on the inner surface of the flange.

As the screw threads are formed only in separate successive portions of the flange, that is, in the flat sides 17, the material has less strain to withstand during the formation of the threads which makes it feasible to form a screw thread having a sharper profile and comprising a greater number of threads than is possible under otherwise comparable conditions when the flange is entirely circular. The risk of fracture of the material is considerably reduced and moreover, if a tear appears in one of the screw thread sections 19, this tear cannot propagate along the screw thread but will come to a dead end in one of the rib or corner portions 18 which are not screw threaded. The portions 18 thus constitute reinforcing ribs and force transmitting elements so that not only is the flange reinforced and stiffened but axial forces imposed on the threads are evenly distributed over the entire flange and all of the screw threads.

In a circular flange screw threads can only be formed from the outside inwards because the tool which has necessarily to be divided up into sectors, at the end of the operation must constitute a continuous uninterrupted circle or cylinder which would be impossible with an expansive tool or tap working from the inside outwards. With the novel form of flange provided by the invention, the tool may be interrupted at the corner portions 18 so that in this case an expansible tap divided up in sectors may be used. The screw threads may thus be formed primarily in that surface of the sheet metal which will be engaged by the threads of the bung or other closure member to be screwed into the bung hole.

In forming a threaded closure flange in accordance with the invention, the operation is carried out in two steps. Thus in the initial step the integral flange 13 is formed on the wall or metal sheet 11 and thereafter the threads are formed in an appropriately shaped portion of the flange. One embodiment of apparatus for carrying out this first phase or step of the operation as shown in FIG. 5 comprises a stamp or punch unit generally indicated at A and a lower unit or die generally indicated at B. The units A and B are suitably mounted for relative movement axially toward and from each other in carrying out the operation, such relative movement being effected by movement of either unit or both may be moved simultaneously, if desired.

The stamp unit A comprises a press head 20 provided with a stamp 21 of a cross sectional shape corresponding to the desired shape of the flange 13, the stamp, in this instance, being octagonal in cross section as shown in FIG. 6. The sides of the octagon thus defined are connected by corners and are dimensioned to conform to the desired internal dimensions of the finished flange. The stamp 21 is carried by a block 22 and both are secured to the press head 20 by means of a screw threaded bolt 23 and a centering block 24. The block 24 serves not only for securing the stamp 21 to the press head 20, but also has a pilot for cooperating with a preformed orifice or hole 12 in the sheet 11 to locate the sheet in correct position relative to the die unit B for formation of the flange. It will be understood, of course, that the preformed pilot hole is substantially smaller in diameter than the finished bung hole. In the preferred form shown, the stamp 21 is surrounded by a press ring 25 capable of yielding axially relative to the stamp 21 against the action of circumferentially spaced springs 26 located between the press head 20 and the ring 25.

Figure 7:
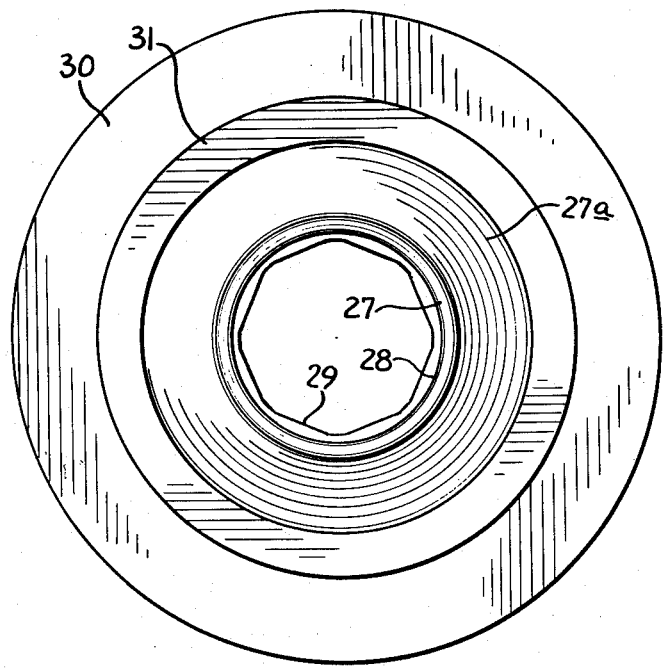
FIG. 7 is a plan view of the lower unit of the die mechanism shown in FIG. 5.

The die unit B comprises a mould ring 27 having an opening with a circular portion 28 (FIG. 7) in the face adjacent the stamp unit A and a polygonal portion 29 extending from and centered with respect to the circular portion. The polygonal portion of the opening has rounded corners and in the exemplary embodiment is octagonal. Moreover, the sides of the octagonal portion 29 are positioned within the circle defined by the portion 28. The mould ring 27 is supported by a bed plate 30 and is surrounded by a supporting ring 31 which is carried by pins 32 and is yieldable against the action of a spring 33.

In operation, the metal sheet 11 is positioned between the stamp unit A and the die unit B with its preformed hole or orifice 12 approximately in coaxial relationship to the units A and B. The units are then relatively moved toward each other either by lowering the stamp unit A or raising the die unit B. As the centering block 24 enters the hole 12, the sheet 11 is exactly centered relative to the die unit. On continued advance of the unit, the sheet is clamped between the press ring 25 and the supporting ring 31. Thereafter by the cooperative action of a conically surfaced recess 25a in the ring 25 with a conical surface 27a on the mould ring 27, the conical connecting portion 14 of the finished product is pressed into the sheet. During this operation the press ring 25 and the supporting ring 31 yield against the action of the springs 26 and 33 relative to the remaining parts of the stamp unit A and the die unit B. Eventually the stamp 21 in its continued movement with the press head 20 enters the mould ring 27 and cooperates with it in forming the circular and octagonal portions of the flange 13. During the final stage of the operation, the supporting ring 31 abutting the bed plate 30 remains stationary while the springs 26 are further compressed and the press ring 25 remains stationary in relation to the stamp 21.

The centering block 24 may, if desired, be replaced by a hollow or solid punch having a cutting edge adapted to cooperate with a cutting edge provided on the die unit for initially punching a hole in a previously imperforate metal sheet.

The flange 13 as formed in the first stage of the operation above described is circular in cross section adjacent its junction with the conical portion 14 of the sheet and merges into the polygonal portion 16 which in this instance is octagonal. In the second phase of the forming operation, the threads 19 are pressed into the flat sides 17 of the polygonal flange portion. A preferred embodiment of apparatus for carrying out this second phase of the flange forming operation as shown in FIG. 8 comprises a stamp unit generally indicated at C and a lower die unit generally indicated at D. The thread forming operation is effected by relative axial movement of the units which may be obtained by movement of either unit relative to the other or by simultaneous movement of both units.

The stamp unit C in its preferred form comprises a press head 34 with a mandrel 35 rigidly secured thereto and projecting axially therefrom. As shown, the mandrel has a conical head 36 formed on its projecting end. The mandrel 35 extends through and is surrounded by a sleeve 37 constructed of steel or other suitable resilient metal and having longitudinally extending slots 38 formed in its projecting end. The lower extremity of the sleeve 37 comprises an externally screw-threaded tap 39 divided up into sectors (FIG. 9) corresponding in number and position to the sides of the polygonal flange portion. The sleeve 37 is mounted on a ring 40 which, guided by pins 41 anchored in the press head, may be moved axially toward the press head against the action of a spring 42.

The die unit D as shown includes a mould ring 43 having an octagonal inner face (FIG. 10) with rounded corners. Screw threads 44 are formed in at least a part of the flat sides or faces of the inner wall of the ring. In the particular form shown, the mould ring 43 is divided into two sections along a plane passing through two diametrically opposite corners of the octagon so that those sections may be moved toward and away from each other. Owing to this particular way of subdivision all sides of the mould ring are self-disengaging. For imparting movements to the mould ring sections, each of them is mounted on a support 45 which may be lowered or raised while being guided by inclined guide pins 46 so that the supports 45 move inwardly on the downward stroke and outwardly on an upward stroke. The mould ring sections 43 are rigidly anchored to the supports 45 and move in unison therewith. That is, the mould ring sections 43 are moved toward one another in the downward movement of the support and are separated from one another on the upward movement of the support.

In operation, the metal sheet 11 with the previously formed flange 13 therein is positioned between the stamp unit C and the die unit D with the flange 13 introduced into the mould ring 43, the same being in its upper position and therefore expanded as shown in FIGS. 8 and 10. The supports 45 are then lowered by suitable mechanism so that both halves of the mould ring 43 tightly enclose the flange 13. Thereafter the stamp unit C is lowered until the face of the sleeve 37 abuts the upper surface of the supports 45. On continued downward movement of the press head 34, the sleeve remains stationary, compressing the spring 42, while the mandrel 35 is advanced to force its conical extremity into the lower complementally shaped end of the sleeve 37. The mandrel 35 accordingly expands the lower end of the sleeve, thereby causing the external thread on the sleeve to press the metal of the sleeve into the threads 44 of the mould ring and thus form screw threads in the flat sides of the flange 13.

After completion of the above operation, and upon raising of the stamp unit C, the supports 45 are raised thereby expanding the mould ring 43 and disengaging it from the now threaded flange 13. As the press head is moved upwardly, the sleeve 37 is gradually projected downwardly to withdraw the head of the mandrel from the tapered end of the sleeve which, due to its resiliency, contracts and withdraws the threads 39 from the threads formed in the flange. Thus the threaded closure flange is completely freed from the forming units and can be removed therefrom.

It will be apparent from the foregoing that the invention provides a closure flange of novel and advantageous construction which can be produced cheaply and efficiently and which affords a thoroughly practical and satisfactory means of securing a closure in the opening in a thin metal sheet such as the wall or head of a container. The improved form of the closure flange permits a stiffer and sturdier construction and allows the formation of sharper threads as well as more of them without danger of cracking or otherwise fracturing the metal of the flange. Moreover, if a fracture should form under extremely adverse conditions, there is no danger of propagating it along the screw threads due to their interruption by transverse stiffening ribs.

The invention also provides a novel method of and apparatus for forming threaded closure flanges on thin metal sheets in accordance with the teachings of the invention. The improved method materially reduces production costs and the apparatus required for carrying out the method is simple and practical.

I claim as my invention:

1. A container including a thin sheet metal wall with an orifice therein, a flange integral with said wall surrounding the orifice, said flange being polygonal in cross section over at least a part of its height and presenting a plurality of flat sides joined by rounded corner portions, and screw threads formed only in the flat sides of the flange.

2. A container including a thin sheet metal wall with an orifice therein, a flange integral with said wall surrounding the orifice, said flange being polygonal in cross section over at least a part of its height and presenting a plurality of flat sides joined by rounded corner portions, and internal screw threads formed in the flat sides of the flange to a depth such that the distance from the axis of the orifice to the bottom of the threads is substantially equal to the distance from such axis to the inner surfaces of the rounded corner portions of the flange.

3. A container including a thin sheet metal wall with a circular orifice therein, a flange integral with said wall surrounding the orifice, said flange being circular in cross section adjacent the wall and polygonal in cross section at the end remote from the wall, said polygonal portion of the flange presenting a plurality of flat sides joined by rounded corner portions, and internal screw threads formed in the flat sides of the flange, the distance from the inner surfaces of said corner portions to the axis of the orifice being substantially equal to the radius of the orifice.

References Cited in the file of this patent

UNITED STATES PATENTS

| | | |
|---|---|---|
| 2,157,354 | Sherman | May 9, 1939 |
| 2,177,027 | Plumb | Oct. 24, 1939 |
| 2,271,107 | Swangren | Jan. 27, 1942 |
| 2,353,253 | Livermont | July 11, 1944 |
| 2,460,720 | Thompson | Feb. 1, 1949 |
| 2,807,226 | Lyon | Sept. 24, 1957 |
| 2,815,569 | Powers | Dec. 10, 1957 |
| 2,880,018 | Robinson et al. | Mar. 31, 1959 |
| 2,889,156 | Dearing et al. | June 2, 1959 |

OTHER REFERENCES

Publication: "The Latest and Greatest Improvement in Steel Barrel Construction." Published by The Draper Mfg. Co., received in Div. 40, Jan. 21, 1942, pp.220–39 UXR. (Copy in Div. 40.)